(12) United States Patent
Jhu et al.

(10) Patent No.: US 10,382,301 B2
(45) Date of Patent: Aug. 13, 2019

(54) EFFICIENTLY CALCULATING PER SERVICE IMPACT OF ETHERNET RING STATUS CHANGES

(71) Applicant: ALCATEL-LUCENT CANADA INC., Ottawa (CA)

(72) Inventors: Michael Jhu, Ottawa (CA); Abdur Rahman, Ottawa (CA)

(73) Assignee: ALCATEL LUCENT, Nozay (FR)

( * ) Notice: Subject to any disclaimer, the term of this patent is extended or adjusted under 35 U.S.C. 154(b) by 95 days.

(21) Appl. No.: 15/350,877

(22) Filed: Nov. 14, 2016

(65) Prior Publication Data

US 2018/0139113 A1    May 17, 2018

(51) Int. Cl.
    H04L 12/26    (2006.01)
    H04L 12/24    (2006.01)
    H04L 12/437   (2006.01)

(52) U.S. Cl.
    CPC ........ *H04L 43/0811* (2013.01); *H04L 12/437* (2013.01); *H04L 41/12* (2013.01)

(58) Field of Classification Search
    CPC ..... H04L 41/0663; H04L 45/22; H04L 45/28; H04L 41/0654; H04L 41/08; H04L 12/437; H04L 41/0659
    USPC ........................... 370/225–242; 709/241–250
    See application file for complete search history.

(56) References Cited

U.S. PATENT DOCUMENTS

| | | | | |
|---|---|---|---|---|
| 7,852,751 B2* | 12/2010 | Bryant | ..... | H04L 45/02 370/218 |
| 8,315,158 B2* | 11/2012 | Goose | ..... | H04L 12/413 370/222 |
| 8,665,708 B2* | 3/2014 | Wang | ..... | H04L 12/56 370/222 |
| 8,675,477 B2* | 3/2014 | Wang | ..... | H04L 12/437 370/221 |
| 8,693,370 B2* | 4/2014 | Wu | ..... | H04L 12/437 370/218 |
| 8,885,656 B2* | 11/2014 | Wu | ..... | H04L 12/462 370/404 |
| 9,071,513 B2* | 6/2015 | Wu | ..... | H04L 41/0663 |
| 9,160,563 B2* | 10/2015 | Ryoo | ..... | H04L 12/437 |
| 9,276,767 B2* | 3/2016 | Bos | ..... | H04L 12/437 |
| 9,344,323 B2* | 5/2016 | Civil | ..... | H04L 41/0654 |
| 9,509,523 B2* | 11/2016 | Shin | ..... | H04L 12/24 |
| 9,647,893 B2* | 5/2017 | Colven | ..... | H04L 41/12 |
| 9,800,432 B2* | 10/2017 | Gohite | ..... | H04L 12/437 |
| 2003/0056153 A1* | 3/2003 | Beer | ..... | H04L 12/437 714/43 |
| 2009/0016214 A1* | 1/2009 | Alluisi | ..... | H04L 45/00 370/228 |
| 2009/0040922 A1* | 2/2009 | Umansky | ..... | H04J 14/0227 370/224 |

(Continued)

*Primary Examiner* — Man U Phan
(74) *Attorney, Agent, or Firm* — Kramer Amado, P.C.

(57) ABSTRACT

Disclosed is a method of determining, by a network manager, a failure in a ring communications network, including determining a plurality of ring segments within different services of a plurality of services using the ring communications network, determining that there are two or more link failures in the ring communications network, determining the ring segments where the two or more link failures are located, and indicating an interruption of one of the services when the two or more failed links are on different ring segments.

10 Claims, 3 Drawing Sheets

(56) References Cited

U.S. PATENT DOCUMENTS

| | | | |
|---|---|---|---|
| 2009/0168646 A1* | 7/2009 | Wang | H04L 12/403 |
| | | | 370/225 |
| 2012/0224471 A1* | 9/2012 | Vinod | H04L 43/0811 |
| | | | 370/222 |
| 2013/0003530 A1* | 1/2013 | Davari | H04L 12/437 |
| | | | 370/225 |
| 2013/0083647 A1* | 4/2013 | Xie | H04L 12/437 |
| | | | 370/216 |
| 2014/0241204 A1* | 8/2014 | Palanisamy | H04L 12/437 |
| | | | 370/254 |
| 2015/0207674 A1* | 7/2015 | Wu | H04L 12/437 |
| | | | 370/228 |
| 2015/0249587 A1* | 9/2015 | Kozat | H04L 43/10 |
| | | | 370/222 |
| 2016/0072640 A1* | 3/2016 | Yang | H04L 12/437 |
| | | | 370/218 |
| 2016/0204976 A1* | 7/2016 | Singh | H04L 12/40 |
| | | | 370/216 |
| 2018/0062974 A1* | 3/2018 | Singh | H04L 45/02 |
| 2018/0167301 A1* | 6/2018 | Hoglund | H04L 43/0811 |

* cited by examiner

EFFICIENTLY CALCULATING PER SERVICE IMPACT OF ETHERNET RING STATUS CHANGES

TECHNICAL FIELD

Various exemplary embodiments disclosed herein relate to reporting interruption of traffic in Ethernet rings.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include a method of determining, by a network manager, a failure in a ring communications network, including determining a plurality of ring segments within different services of a plurality of services using the ring communications network, determining that there are two or more link failures in the ring communications network, determining the ring segments where the two or more link failures are located, and indicating an interruption of one of the services when the two or more failed links are on different ring segments.

The method may include indicating no interruption of one of the services when the two failed links are on the same ring segment.

The method may include monitoring channeling traffic by a ring owner around the ring communications network in a first direction, and monitoring channeling of the traffic by the ring owner around the ring communications network in a second direction opposite to the first direction when the two failed links are on the same ring segment.

The network manager may be notified by a network element in the ring of the failed links.

The services may be ethernet services. The traffic may be ethernet traffic.

Various embodiments also include a network manager configured to manage a failure in a ring communications network, including a network interface, a memory device, and a processor in communication with the interface memory device, the processor being configured to determine a plurality of ring segments within different services of a plurality of services using the ring communications network, determine that there are two link failures in the ring communications network, determine the segments where the two link failures are located, and indicate an interruption of one of the services when the two failed links are on different ring segments.

The network manager processor may indicate no interruption of one of the services when the two failed links are on the same ring segment.

The network manager processor may monitor channeling of traffic by a ring owner around the ring communications network in a first direction and monitors channeling of the traffic by a ring owner around the ring communications network in a second direction opposite to the first direction when the two failed links are on the same ring segment.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
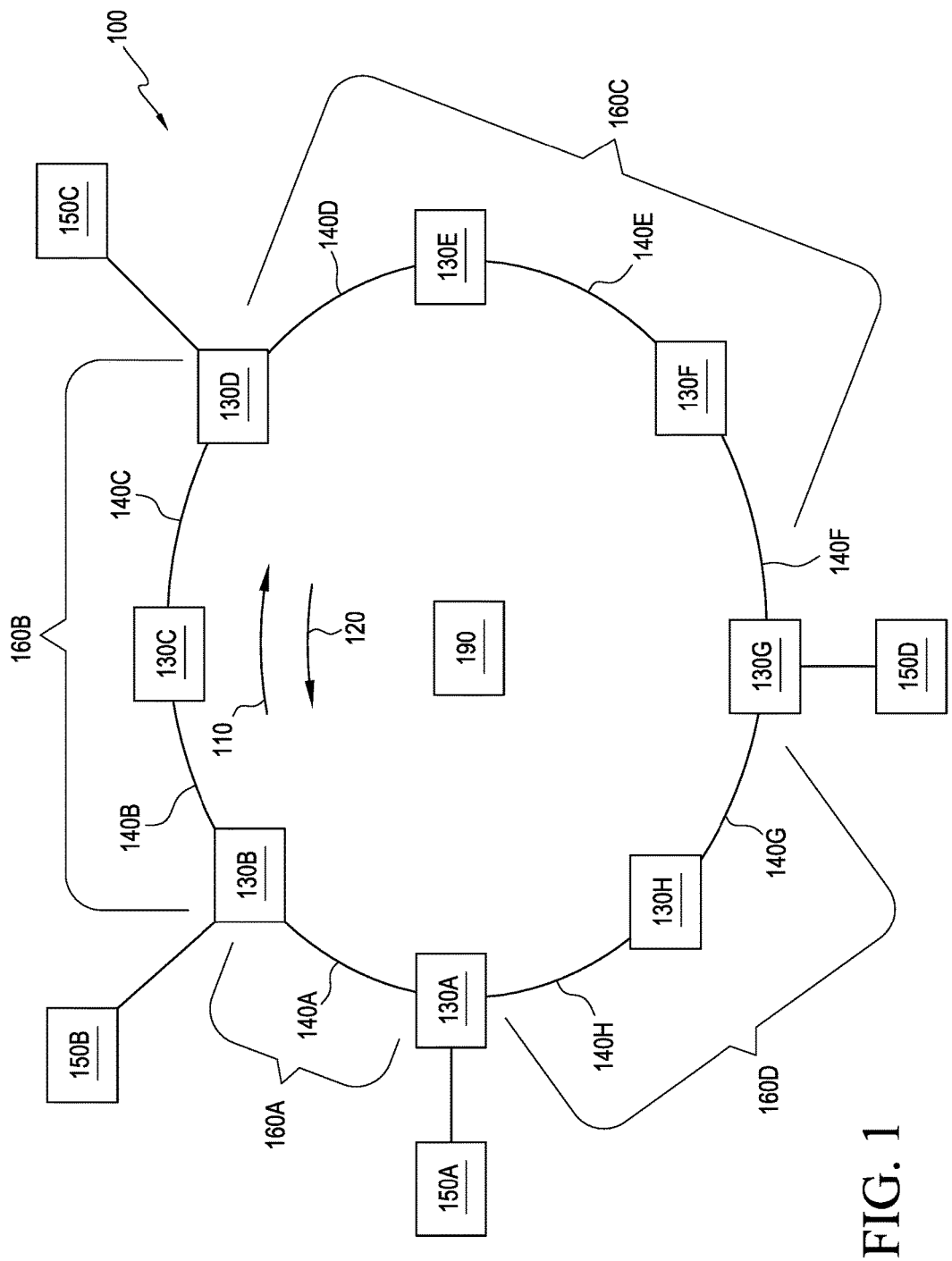
FIG. 1 illustrates a ring in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

FIG. 1 illustrates a ring communications network 100, also called an ethernet ring, in accordance with embodiments described herein. An ethernet ring 100 may enhance data transfer reliability because ethernet traffic may flow in two directions 110 and 120 around the ring 100. An ethernet ring 100 may support a plurality of ethernet services. In the context of telecommunications, services are an interconnected collection of data connections, which may include connections within network elements that form the ring. An ethernet ring 100 may be a component part of those services. Principles described herein are not limited to ethernet rings and may be used in any redundant circuit topology where ingress and egress points are used to gain access to a ring. The use of the terms ethernet, ethernet services, ethernet rings, and related terms are used in an exemplary manner and are not limited thereto. Rings need not be circular in nature or form.

One issue that arises in ethernet rings is how to determine a status of the ethernet ring. A ring may be deemed operational when traffic can flow in both directions between network devices and ethernet services, inoperational where no traffic flows, or partially operational where data may flow in one direction or may flow between specific network devices or ethernet services. In ethernet rings, different identification numbers and labels are assigned to different components of a ring such that various portions of a ring may be monitored.

The ring 100 may have a plurality of demarcation points. Ingress and egress access to the ring 100 may be controlled by a plurality of network devices 130A, 130B, 130C, 130D, 130E, 130F, 130G, and 130H. The number of networks devices are not limited to this amount and may span into the hundreds and thousands. A network device may also be referred to as an owner, for example 130A. The owner network device 130A may control the amount of traffic passing there through and the direction the device 130A wants data traffic to flow around the ring 100. Connections between the network devices 130A-130H may be made through ethernet links. An interface between network device 130A and network device 130B, for example, may be a ethernet link 140A. Additional ethernet links between the network devices 130B-130H are shown as ethernet links 140B-140H. Because traffic may flow in two directions, the failure of a ethernet link 140A within the ring 100 does not cause any traffic flow disruption, for example, because the traffic can be reversed and continue to flow in another direction 120 between any two network devices on the ethernet ring 100. Failure of an ethernet link may also be referred to as a change in operational state.

The network devices 130A-130H that make up a ring may have a purpose of connecting ethernet services that use the network devices 130A-130H. As illustrated in FIG. 1, the ethernet ring 100 may be a part of a plurality of ethernet services 150A, 150B, 150C, and 150D. The number of ethernet services is not limited thereto and may number in the hundreds or thousands. Ethernet services may include applications, software, data, platforms, etc. such as Facebook, Instagram, Yahoo, including any and every program traffic and data traffic flow that may be communicated via ethernet.

For a network manager one challenge is to calculate an impact on each ethernet service 150A-150D that uses an ethernet ring 100 when more than one ethernet link within the ethernet ring 100 has failed. Network management systems can provide information to neighboring devices and systems to inform devices and systems of what resources are available, which are offline, inoperational, or partially operational. Network management systems may also provide this information to human network operators. Network management systems do not want to over-report or under-report failures within a network.

In some embodiments, a network owner such as owner network device 130A will desire to pass traffic coming in from ethernet service 150A to network device 130B, for example. To route the traffic, instead of leaving open both directions of the ring 100, the owner network device 130A may prevent access to the ethernet link 140H, and direct ethernet traffic in a clockwise direction 110 along ethernet link 140A. In this manner, traffic can be managed in one direction by the owner network device 130A. If a failure occurs, the owner network device 130A may block off access to ethernet link 140A, unblock path 140H, and route traffic to ethernet link 140H to restore the data transmission path through the ethernet ring 100.

For example, traffic from ethernet service 150A may need to be routed to ethernet service 150C along path including ethernet links 140A, 140B, and 140C. If one of the ethernet links 140A, 140B, or 140C should fail or change operational state, the network device 130A may re-route data traffic along ethernet links 140H, 140G, 140F, 140E, and 140D in the opposite direction 120 to reach ethernet service 150C.

A problem may arise in determining the functionality of a ring in which multiple ethernet links fail or change operational state in different parts of an ethernet ring 100, and determining which, if any, parts of the ethernet ring 100 are still operational.

A solution may require that at least two ethernet links must be inoperational in order for one or more ethernet services using the ring 100 to be inoperational. However, this strategy may significantly over-report ethernet service disruption because some ethernet services may still be accessible.

Numerous algorithms could be postulated that require extensive calculations to determine the per service impact of multiple inoperable interfaces within an ethernet ring. Those calculations would increase either the time required to complete the calculation for each ethernet service and/or the amount of computer resources required to perform that calculation. In large rings and networks this may increase the loading of the network manager to undesirable levels.

For each ethernet service 150A-150D, the ethernet ring 100 may be partitioned into ring segments 160A, 160B, 160C, and 160D, where each ring segment is a combination of ethernet links 140A-140H within services of two ethernet service terminations. Ring segments 160A-160D are used as an example, as one skilled in the art would be able to determine that numerous ring segments may be used based on the size of a ring and a number of ethernet services and ethernet links included therein. Referring to FIG. 1, a first ring segment 160A may be a part of ethernet service 150A or ethernet service 150B including ethernet link 140A between the network device 130A and network device 130B. A second ring segment may be ring segment 160B connecting ethernet services 150B and 150C. The second ring segment 160B includes link 140B and link 140C.

Embodiments described herein may include a network manager 190. The network manager 190 may monitor an operational status of an ethernet ring 100. The network manager 190 may communicate with network devices 130A-130H within the ethernet ring 100, and ethernet services 150A-150D. The network manager 190 may also communicate with network devices in external ethernet rings and ethernet services. This communication with the network manager 190 may use any of the various devices in the network.

Referring to ring segment 160B, in one embodiment, if both ethernet links 140B and 140C fail, the network manager 190 could determine that two ethernet links are down, therefore the whole ethernet ring 100 is down, and network devices would be notified that none of the ethernet services of the ring 100 are available. The network manager 190 may be notified of failed link(s) by a ring owner or network element(s) within the ring 100 that is connected to the failed link(s). This is an overly conservative approach, as ethernet ring 100 is still able to connect each of the different ethernet services 150A-150D through an alternative direction of traffic flow.

In one embodiment, the network manager 190 would recognize that the failure of two ethernet links 140B and 140C are within the same ring segment 160B, and the network manager 190 would inform devices within the ethernet ring 100 and other devices in other rings that ethernet services are still available, based on the determination that both ethernet links 140B and 140C are in the same ring segment 160B. However if a determination is made that an ethernet link in both ring segments 160A and 160B are down, then the network manager 190 would inform other entities within and outside the ring 100 that traffic to and from ethernet service 150B is interrupted, until one of the ring segments 160A or 160B is repaired.

Ring segment 160C encompasses ethernet links 140D, 140E, and 140F, as well as network devices 130E and 130F. If a plurality of the devices or ethernet links that make up the ring segment 160C should fail, the network manger 190 would determine that only service between ethernet service 150C and ethernet service 150D is interrupted in one direction from network device 130D to network device 130G for example in direction 110, but traffic could still flow in the other direction 120 around the ring 100 from network device 130D to network device 130G.

Figure 2:
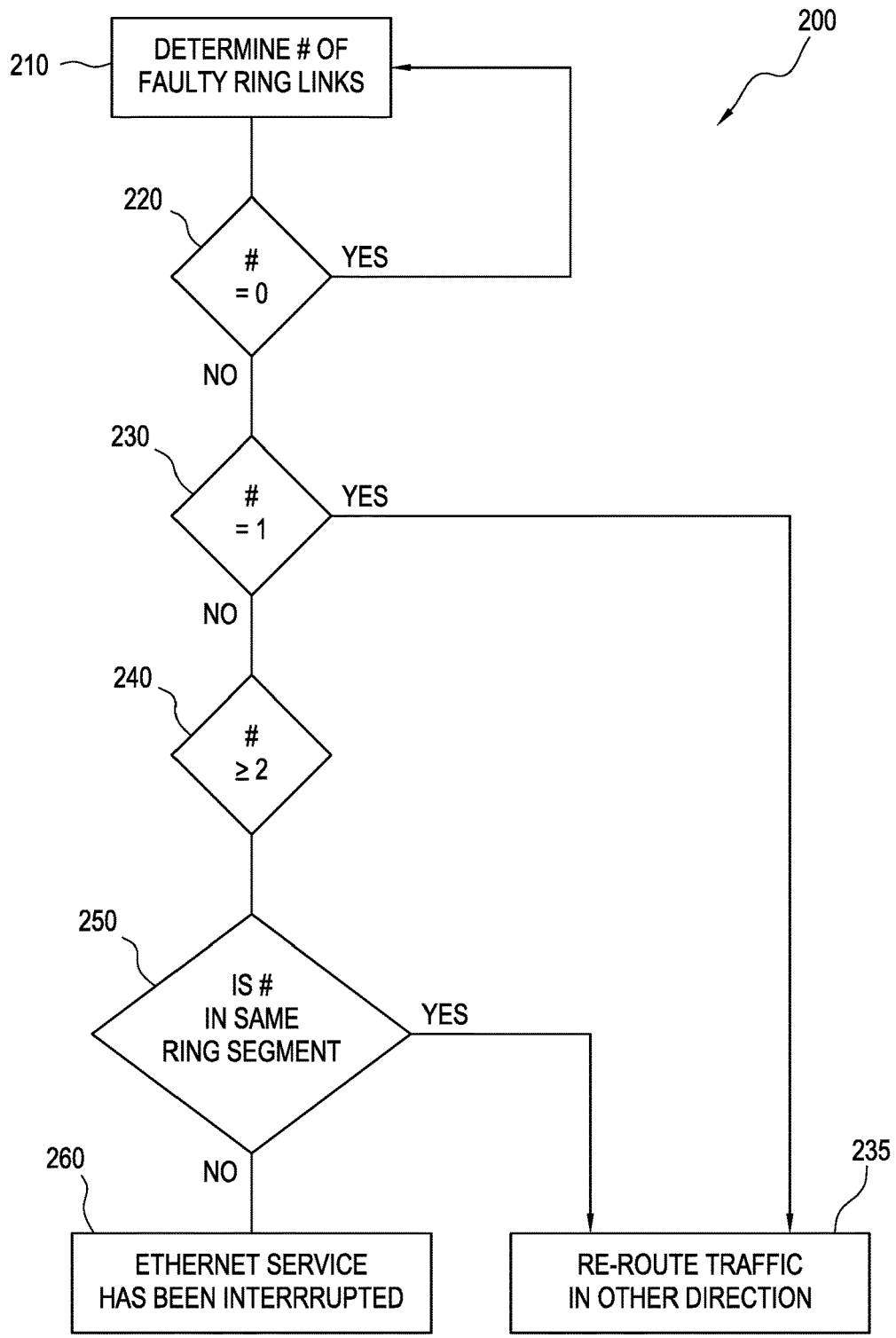
FIG. 2 illustrates a flow chart of a method to determine per service impact of ring status changes in accordance with embodiments described herein.

FIG. 2 illustrates a flow chart 200 of a method to determine per service impact of ring status changes in accordance with embodiments described herein. As described above, traffic may be routed around a ring in one direction while blocking traffic flow in the opposite direction as directed by the network network device. As illustrated in FIG. 2, a network manager may determine in step 210 through active monitoring of a ring 100 or of messages received via one or several network devices that one or more ethernet links have failed or changed in operational state. An initial determination loop 220 is always running that does not trigger action by a network manager when a number of ethernet link faults equals zero. In operation, when a specific ethernet link fails or changes operational state, a network manager may determine the corresponding ring segment for each ethernet service and the impact on that segment. At step 230, a network manager may determine that a number of faults in the ethernet links is one. Because one represents the smallest number of ethernet links that may make up a ring segment and also represents that traffic may not flow through that ethernet link, the owner network device in control of the traffic flow may re-route traffic in the other direction at step 235. Thus if zero or one ring segments are inoperational, traffic to a given ethernet service remains operational.

For a given ethernet ring, the ethernet ring is inoperational if two or more ring segments are inoperational, the determination being made by the network manager. At step 240, the network manager may determine that the number of faults is two or more. In previous embodiments, if a system determines that a number of faults is two or more, a network manager may over-report that any service that includes the ring is inoperational or down, thus wasting valuable resources and time. Here, in step 250, a determination is made whether the two or more ethernet links that are down are within the same ring segment. If the two or more ethernet links are in the same ring segment (Yes), then the network manager monitors an ethernet ring owner that re-routes traffic in the other direction to the particular destination. If in step 250 it is determined by the network manager that the ethernet links are not in the same ring segment (NO), then the network manager will determine which network service is not available, will determine based on the placement of the faults which ethernet services still are available, and will continue to monitor traffic through the ring to the available devices and ethernet services. Thus, using the ring structure and methods described herein, faults of two or more ethernet links will not automatically shut the ethernet ring down, which may provide an efficient calculation of per service impact of ethernet ring status changes.

This concept may be extended to an arbitrary number of ethernet rings, an arbitrary number of ethernet services, and a "many to many" relationship among them in which each ethernet service can use multiple ethernet rings, and each ethernet ring can be used by multiple ethernet services. For ethernet services that use multiple ethernet rings, the preceding calculation is performed independently on each ethernet ring.

Figure 3:
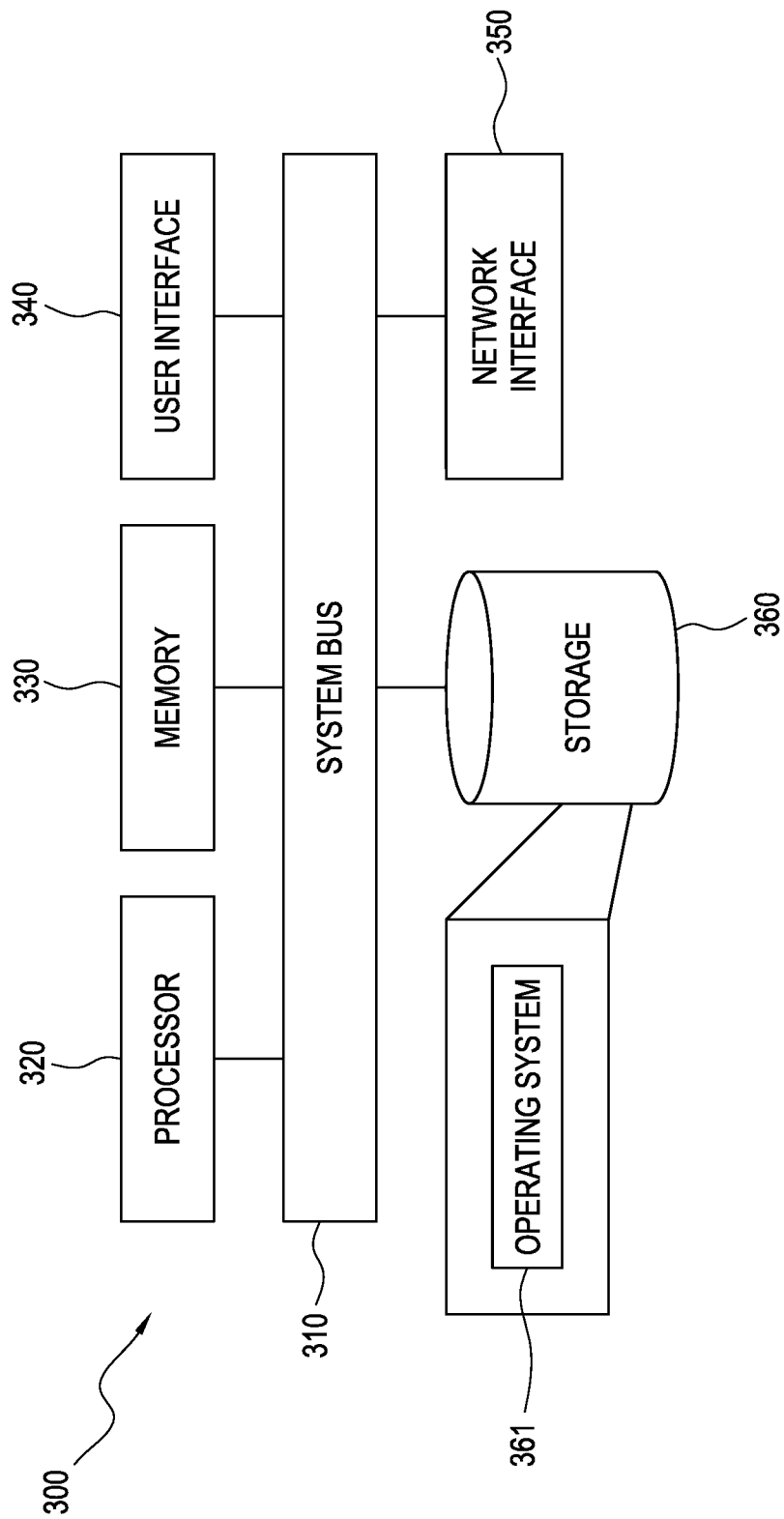
FIG. 3 illustrates an exemplary hardware diagram configured to implement a network manager in accordance with embodiments described herein.

FIG. 3 illustrates an exemplary hardware diagram 300 configured to implement a network manager in accordance with embodiments described herein. The exemplary hardware 300 may correspond to one or more network managers 190 of FIG. 1. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A method of determining, by a network manager, a failure in a bidirectional ring communications network, comprising:
    determining a plurality of ring segments within different services of a plurality of services using the bidirectional ring communications network;
    determining that there are two link failures in the bidirectional ring communications network;
    determining that the two link failures are located on different ring segments;
    indicating an interruption of one of the different services when the two failed links are located on the different ring segments;
    determining that the two link failures are not located on different ring segments; and
    reversing traffic flow in the bidirectional ring communications network and indicating no interruption of one of the different services when the two failed links are not located on different ring segments.

2. The method of claim 1, further comprising:
    monitoring channeling of traffic by a ring owner around the bidirectional ring communications network in a first direction; and
    monitoring channeling of the traffic by the ring owner around the bidirectional ring communications network in a second direction opposite to the first direction when the two failed links are on the same ring segment.

3. The method of claim 1, wherein the network manager is notified by a network element in the bidirectional ring communications network of the two failed links.

4. The method of claim 1, wherein the different services are ethernet services.

5. The method of claim 2, wherein the traffic is ethernet traffic.

6. A network manager configured to manage a failure in a bidirectional ring communications network, comprising:
    a network interface;
    a memory device; and
    a processor in communication with the interface and the memory device, the processor being configured to determine a plurality of ring segments within different services of a plurality of services using the bidirectional ring communications network, determine that there are two link failures in the bidirectional ring communications network, determine that the two link failures are located on different ring segments, and indicate an interruption of one of the different services when the two failed links are on the different ring segments, determine that the two link failures are not located on different ring segments, and reverse traffic flow in the bidirectional ring communications network and indicate no interruption of one of the different services when the two failed links are not located on different ring segments.

7. The network manager of claim 6, wherein the processor is configured to monitor channeling of traffic by a ring owner around the bidirectional ring communications network in a first direction and channeling of the traffic by the ring owner around the bidirectional ring communications network in a second direction opposite to the first direction when the two failed links are on the same ring segment.

8. The network manager of claim 6, wherein the network manager is notified by a network element in the bidirectional ring communications network of the two failed links.

9. The method of claim 6, wherein the different services are ethernet services.

10. The method of claim 7, wherein the traffic is ethernet traffic.

* * * * *